United States Patent
Skoll (10) Patent No.: US 6,549,222 B1
(45) Date of Patent: Apr. 15, 2003

(54) LOCK-STEP CURSORS FOR FEATURE ALIGNMENT

(75) Inventor: David F. Skoll, Ottawa (CA)

(73) Assignee: Chipworks, Ottawa (CA)

( * ) Notice: Subject to any disclaimer, the term of this patent is extended or adjusted under 35 U.S.C. 154(b) by 465 days.

(21) Appl. No.: 09/604,252

(22) Filed: Jun. 27, 2000

(Under 37 CFR 1.47)

(51) Int. Cl.$^7$ ............................ G09G 5/00; G06K 9/62
(52) U.S. Cl. ...................................... 345/856; 382/149
(58) Field of Search .................... 345/857, 858, 345/859, 860, 856, 862, 861, 754, 781, 810; 382/142, 143, 144, 145

(56) References Cited

U.S. PATENT DOCUMENTS

| | | | |
|---|---|---|---|
| 4,623,255 A | 11/1986 | Suszko | 356/389 |
| 5,086,477 A | 2/1992 | Yu et al. | 382/8 |
| 5,590,271 A | 12/1996 | Klinker | 395/326 |
| 5,694,150 A * | 12/1997 | Sigona et al. | 345/856 |
| 5,699,534 A * | 12/1997 | Barber et al. | 345/856 |
| 5,761,064 A | 6/1998 | La et al. | 364/468 |
| 6,075,531 A * | 6/2000 | DeStefano | 345/788 |
| 6,177,937 B1 * | 1/2001 | Stockham et al. | 345/807 |
| 6,184,883 B1 * | 2/2001 | Bates et al. | 345/794 |
| 6,219,027 B1 * | 4/2001 | Shimizu et al. | 345/733 |

FOREIGN PATENT DOCUMENTS

| EP | 0 401 077 | 5/1990 | G06F/15/68 |
|---|---|---|---|
| JP | 2000123961 | 4/2000 | G06F/3/033 |

OTHER PUBLICATIONS

Article "A 3–D Interactive Editor for Brain Cortical Sulcal Anatomy Labelling", Frouin et al. IEEE, 1994, pp. 323–328.
Article Registered High Resolution Images in the Interpretation of Radionuclide Scans, Hill et al., IEEE 1990, pp. 143–144.

* cited by examiner

Primary Examiner—Kristine Kincaid
Assistant Examiner—Thanh T Vu
(74) Attorney, Agent, or Firm—Max R. Wood; Ogilvy Renault (57) ABSTRACT

An apparatus for extracting design and layout information from image-mosaics of a progressive deconstruction of a semiconductor integrated circuit (IC) includes a visual display, a system pointer and a plurality of lockstep cursors. The visual display displays views of an area of interest of the respective image-mosaics. Each view displays one of the lock-step cursors when appropriate, as determined by a position of the system pointer. When the system pointer is within a view, a corresponding lock-step cursor is displayed as a master-cursor, while other views display a lock-step cursor that has a different size and shape than the master-cursor. All lock-step cursors move in unison under the control of the master-cursor. A method for extracting design and layout information from image-mosaics uses the lock-step cursors to quickly match features across image-mosaics, and to avoid transposition errors while tracing features from one image-mosaic to another.

33 Claims, 7 Drawing Sheets

LOCK-STEP CURSORS FOR FEATURE ALIGNMENT

FIELD OF THE INVENTION

This invention relates generally to the analysis of semiconductor integrated circuits and, in particular, to a man-machine interface for manipulating a plurality of images representative of a surface of a deconstructed semiconductor integrated circuit (IC) to extract design and layout information therefrom.

BACKGROUND OF THE INVENTION

In the semiconductor industry it is often necessary to physically analyze semiconductor integrated circuits (ICs) for the purposes of product reliability assurance, design validation and identification of device structural patterns. ICs are analyzed to extract design and/or layout information therefrom. This process is known as reverse-engineering. Reverse-engineering is also part of the test and development process in the manufacture of ICs on a large scale. In general, a vast amount of time and manual labor is required to reverse-engineer an IC.

An IC is a monocrystaline silicon die upon which a large number of transistors and other electronic components have been fabricated and interconnected to form a useful circuit. During manufacture, each die is part of a larger silicon wafer substrate which facilitates handling and simultaneous processing of a plurality of ICs.

The IC fabrication process includes: doping the silicon substrate to change its conductive properties and building up a sequence of layers onto the silicon substrate using different techniques. Doping layers are created using ion implantation. Diffusion layers are created by depositing dopants on top of a substrate and heating the wafer. With each deposition layer, different materials are deposited and selectively removed by selective etching in accordance with a predetermined pattern. Components manufactured on the silicon wafer span multiple layers. Oxide layers are used for insulation. Deposited metal layers are used to interconnect individual terminals of the components so formed.

It is the identification of these components and the interconnections provided by the metal layers that provides base information from which the design and/or layout of an IC can be extracted and verified.

In reverse-engineering a sample IC, the die is deconstructed. The IC sample die is subjected to a progressive layer-removal sequence utilizing an exacting series treatment, such as acid etchants, each of which is specifically chosen to remove a single layer at the time. Other deconstructive treatments include dry etching, polishing, etc. Using such treatments, interconnecting metal layers, polycrystalline silicon layers, oxide layers, etc. are removed step-by-step. At each deconstructive step the surface of the partly deconstructed IC is inspected.

Inspection techniques include the use of: optical microscopes, scanning electron microscopes, and other surface inspection equipment. In general, the scanning electron microscope is accurate but is expensive to own and operate. Optical microscopes can be used in brightfield, contrast interference and darkfield modes of illumination.

In the brightfield or contrast interference modes, the physical extents of the components on the die are distorted by fringe effects. These fringe effects can be interpreted by an experienced human analyst but require vast amounts of computation for analysis by a computer.

A "METHOD OF EXAMINING MICROCIRCUIT PATTERNS" is described in the U.S. Pat. No. 4,623,255 which issued Nov. 18, 1986 to Suszko. The method involves photographing an IC die in between deconstructive steps. Film transparencies are printed and used by an engineer analyst to extract design and layout information from the photographed IC. While the teachings of Suszko have merit, design and layout extraction are impeded by the handling and cross-correlation of the bulky transparencies.

Another "AUTOMATED SYSTEM FOR EXTRACTING DESIGN AND LAYOUT INFORMATION FROM AN INTEGRATED CIRCUIT" is described by Yu et al. in U.S. Pat. No. 5,086,477 which issued Feb. 4, 1992. A digital camera and a controlled stage are used to capture images in overlapping tile fashion after each deconstructive step. The captured digital images are stored in a computer memory and reassembled into image-mosaics based on the overlap at the borders of each tile image. Yu et al. describe pattern matching performed on an image-mosaic of a deconstructive step, and points out the difficulties involved in extracting layout information from the tile images. The automated system to Yu et al. appears to be suitable for extracting design information from complex ICs that are difficult to reverse engineer. To accomplish this, "cell" libraries are built. The cell libraries contain images of specific arrangements of components that are known to perform a specific function.

The cell libraries are used for automated pattern matching in order to facilitate reverse engineering of Application Specific Integrated Circuits (ASICs), for example. However, Yu et al. fail to describe how multiple image-mosaics, each representing a different step in the deconstruction of an IC, are manipulated in order to extract design and layout information concurrently therefrom. Concurrent analysis of image-mosaics is desirable because individual components fabricated on the silicon wafer may span multiple layers.

There is therefore a need for a man-machine interface that enables manipulation of multiple images of an IC to facilitate concurrent extraction of design and layout information therefrom.

SUMMARY OF THE INVENTION

It is an object of the invention to provide a man-machine interface adapted to facilitate feature recognition and analysis across multiple images representative of one or more surfaces of a semiconductor integrated circuit (IC).

It is another object of the invention to provide a man-machine interface that supports multiple views, each view displaying a portion of an image-mosaic and one of a group of multiple lock-step cursors.

In accordance with one aspect of the invention a man-machine interface for analyzing image-mosaics is presented. The man-machine interface includes a display area, a system pointer, a plurality of mosaic-views and a corresponding plurality of lock-step cursors. The image-mosaics are aligned to a sample coordinate space. The display area defines a display coordinate space and the system pointer has a position with respect to the display coordinate space. Each one of the plurality of mosaic-views has view-boundaries in the display coordinate space and displays one of the plurality of image-mosaics. Each lock-step cursor has a position in the display coordinate space and shares positional coordinates in the sample coordinate space with all of the other lock-step cursors. The system pointer, when positioned within at least one view-boundary, takes on a representation of a master-cursor which controls cursor-events.

Lock-step cursors are displayed in the other views at the position of the master-cursor in the sample coordinate space. The image-mosaics are, for example, representative of a deconstructed semiconductor integrated circuit (IC) sample.

According to another aspect of the invention, the man-machine interface further includes a navigation window having view-boundaries in the display coordinate space and displaying a low magnification image representative of the IC sample. The navigation window also enables the selection of at least one area-of-interest displayable in a plurality of mosaic-views.

The invention also provides a method of analyzing image-mosaics that are scaled and aligned to a sample coordinate space. The method comprises steps of displaying an area of interest of respective ones of a plurality of the image-mosaics within respective mosaic-views displayed on a display coordinate space of a man-machine interface used to analyze the image-mosaics. The method further comprises a step of tracing features of the IC across at least two of the mosaic-views using a master-cursor in a one of the mosaic-views and lock-step cursors in others of the mosaic-views. The master-cursor controls cursor events and the lock-step cursors are displayed within the other mosaic-views at a relative position of the master-cursor with respect to the sample coordinate space, provided that the relative position is within the respective display coordinate space of the other mosaic-views.

The image-mosaics are created, for example, by deconstructing a semiconductor integrated circuit (IC) sample. An area of interest of an image-mosaic is created using a slice creation tool to define coordinates on the sample coordinate space. The slice is preferably created by dragging a system pointer along a diagonal path to define a rectangular area of interest on a low resolution die photo of the IC sample. After the slice is created, image-mosaics to be displayed in mosaic-views of the area or interest are selected. The image-mosaics to be displayed in mosaic-views of the area of interest may be selected from a list of all image-mosaics associated with the slice, or selected automatically by the apparatus. When the master-cursor is removed from the one of the image-mosaics, the master-cursor becomes a system pointer on the display surface of the man-machine interface, and the lock-step cursors are erased from each of the other mosaic-views.

The invention further provides an apparatus for analyzing image-mosaics, the image-mosaics being scaled and aligned to a sample coordinate space. The apparatus comprises a workstation having a display area that defines a display coordinate space, and a pointing device that controls a system pointer that may be moved within the display coordinate space. A memory for storing a plurality of mosaic-views having respective view-boundaries when displayed in the display coordinate space, each mosaic-view displaying at least a portion of one of the image-mosaics. An algorithm displays a lock-step cursor within each of the mosaic-views, the lock-step cursors sharing positional coordinates with respect to the sample coordinate space. When system pointer is moved across a view-boundary into a one of the plurality of mosaic-views by manipulation of the pointing device, the system pointer is displayed as a master-cursor that controls cursor events and the lock-step cursors are displayed within other mosaic-views at a relative position of the master-cursor with respect to the sample coordinate space, provided that the relative position is within the respective display coordinate space of respective ones of the other mosaic-views.

When a cursor event indicating cursor movement is detected, the means for displaying converts coordinates of the system pointer in the display coordinate space to coordinates in the sample coordinate space and performs an iterative process to send the coordinates in the sample coordinate space to each of the other mosaic-views, if the coordinates of the system pointer in the display coordinate space are within a one of the mosaic-views.

The advantages of the system include increased production and reduction of analyst fatigue due to the facilitation of feature matching across image-mosaics and the avoidance of transposition errors while tracing components from one image-mosaic to another.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE EMBODIMENTS

Figure 1:
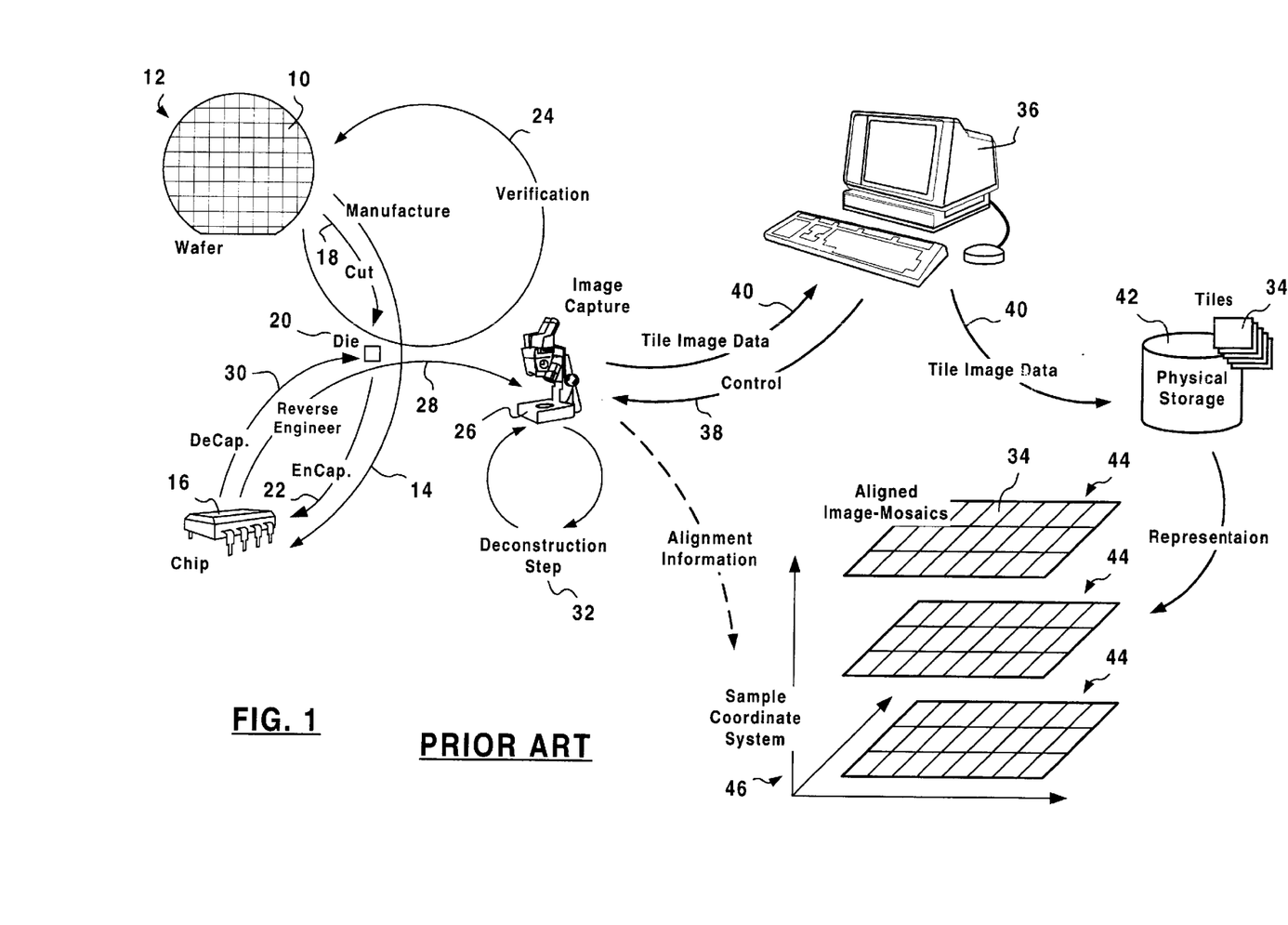
FIG. 1 is a work flow diagram showing an overview of an exemplary process by which image-mosaics representative of steps in a deconstruction of a semiconductor integrated circuit (IC) are acquired.

FIG. 1 is a work-flow diagram showing an overview of an exemplary prior art process by which image-mosaics representative of steps in the deconstruction of a semi-conductor integrated circuit (IC) are acquired. ICs 10 are fabricated on a wafer 12. The wafer 12 comprises a mono-crystalline silicon substrate which is a natural insulator. Doping the silicon substrate with other chemical elements can change the properties of the silicon, including making the silicon substrate a semi-conductor or a conductor. Such substrate processing is performed as part of a manufacturing process 14 of chip 16. In packaging a chip 16, a die 20 is cut in a step 18 from the wafer 12 and is encapsulated in step 22 to form the chip 16.

The manufacture of integrated circuits typically involves a verification process 24 by which wafers 12, cut dies 20, or portions thereof are inspected using a micro-imaging system 26 to extract design and layout information for design validation or purposes of competitive analysis.

For the purposes of product quality assurance or competitive analysis, for example, a process of reverse-engineering 28 is performed on the chip 16. A first step in the reverse-engineering process 28 is decapsulation 30 of the chip 16 to remove the die 20. Die 20 is inspected using a micro-imaging system 26 to extract design and layout information. The micro-imaging system 26 may include high magnification optical microscopes, scanning electron microscopes, field emission electron microscopes, or the like. Design and layout extraction from a die 20 or portion thereof involves, as shall be described below with respect to FIG. 3, a process of deconstruction 32 by which layers formed during the manufacturing process 14 are removed step-by-step.

High magnification tile images 34 of the sample die 20 are acquired between each deconstructive step 32 under the control of a computer workstation 36. The computer workstation 36 controls the micro-imaging system 26 using control signals 38. The computer workstation 36 receives tile image data 40 from the micro-imaging system 26 and saves the tile image data 40 to memory, typically physical storage 42, such as a hard disk.

The stored tile images 34 are assembled into image-mosaics 44, each image-mosaic 44 representing a surface of the die 20 at a deconstructive step 32. During acquisition of the tile images 34 of the die 20, a sample coordinate space 46 is defined. The sample coordinate space 46 is used to align the tile images 34 and the image-mosaics 44.

Figures 2, 3:
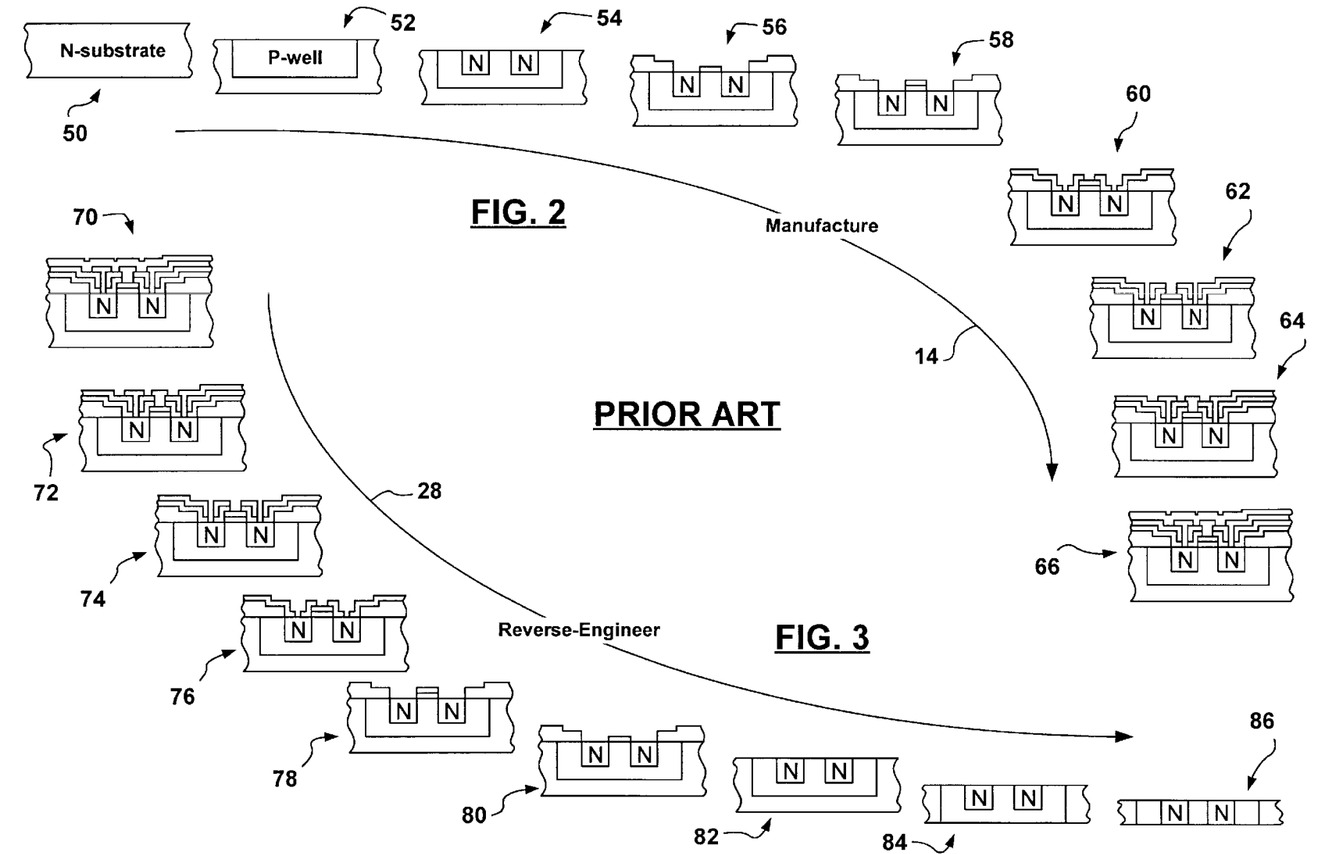
FIG. 2 is a process diagram showing an exemplary progression of steps in manufacturing an IC.
FIG. 3 is a process diagram showing an exemplary progression of steps in deconstructing an IC for reverse-engineering.

FIG. 2 is a process diagram showing an exemplary prior art progression of steps followed during the manufacture of an IC. The diagram shows a progression of cross-sections through a silicon substrate, representing exemplary steps in manufacturing a component such as a junction. In step 52 of the progression, the silicon substrate is doped using diffusion and/or ion implantation techniques to change its characteristics and in particular to define P-wells, well known in the art. In step 54, the implantation technique is used to form an n-type source and drain. A gate oxide layer is deposited between the source and the drain and a field oxide layer over other areas in step 56. A polysilicon gate layer is deposited in step 58, and in steps 60 and 62 the deposition of two oxide layers is effected. Metal layers for providing connectivity between the gates, sources and drains on the silicon substrate are deposited in step 64. Step 66 illustrates the deposition of a pasivation layer, typically used to protect the IC from physical damage and/or contamination with dust particles before it is encapsulated in step 22 (FIG. 1).

FIG. 3 is a process diagram showing an exemplary prior art progression of deconstructive steps used to reverse-engineer a sample IC. Step 70 illustrates a cross-section through a silicon substrate of a die 20 after decapsulation in step 30 (FIG. 1). Steps 72, 74, 76, 78, 80 and 82 illustrate a progressive removal of the deposited material layers, such as the pasivation layer, metalization layers, polysilicon layers, base contact layers, the field oxide layer, etc. This results in an exposed silicon substrate (step 82) including the well structures manufactured during steps 52 and 54 (FIG. 2). In order to reveal the well structure, the back surface of the die 20 may also be deconstructed. Steps 84 and 86 show the progressive deconstruction of the back surface of the die 20 to expose the P- and N-wells. In extracting design and layout information both surfaces of the die 20 are preferably micro-imaged, and therefore both represent surfaces-of-interest.

Figure 4:
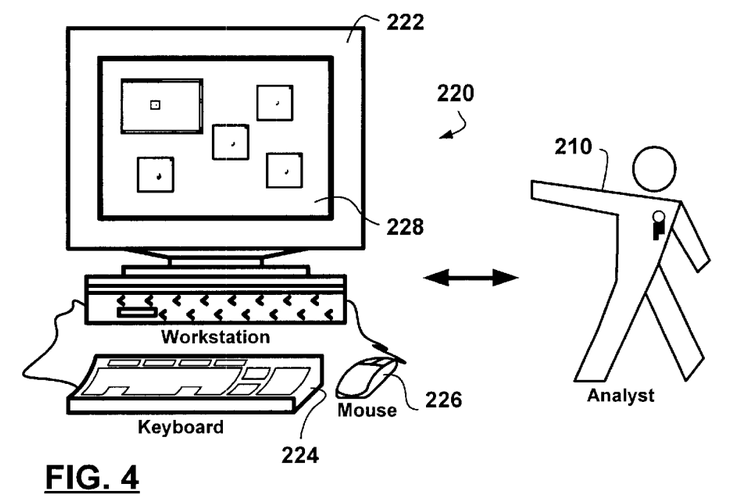
FIG. 4 is a schematic diagram showing a man-machine interface having a visual display for displaying multiple views and associated lock-step cursors in accordance with a preferred embodiment of the invention.

FIG. 4 is a schematic diagram showing a man-machine interface in accordance with the invention for analyzing integrated circuits (ICs). In analyzing ICs to extract design and layout information, an engineer analyst 210 utilizes a workstation 220 having a visual display 222, a keyboard 224 and a pointing device 226, such as, but not limited to, a mouse. The visual display 222 has a display area 228 that defines a corresponding display coordinate space. A system pointer displayed in the display area 228 is controlled by the pointing device 226. The system pointer has a distinctive shape, size and color.

The visual display 222 is typically a Cathode Ray Tube (CRT), a Liquid Crystal Display (LCD), an image projected by an image projector, or the like. Alternatively the man-machine interface may include a distributed visual display provided by a multi-headed visual display (not shown), a distributed windowing environment spanning visual displays 222 of a plurality of workstations 220, etc. Distributed windowing environments are commercially available from the XConsortium®, NeXTStep®/OpenStep®, etc.

Figure 5:
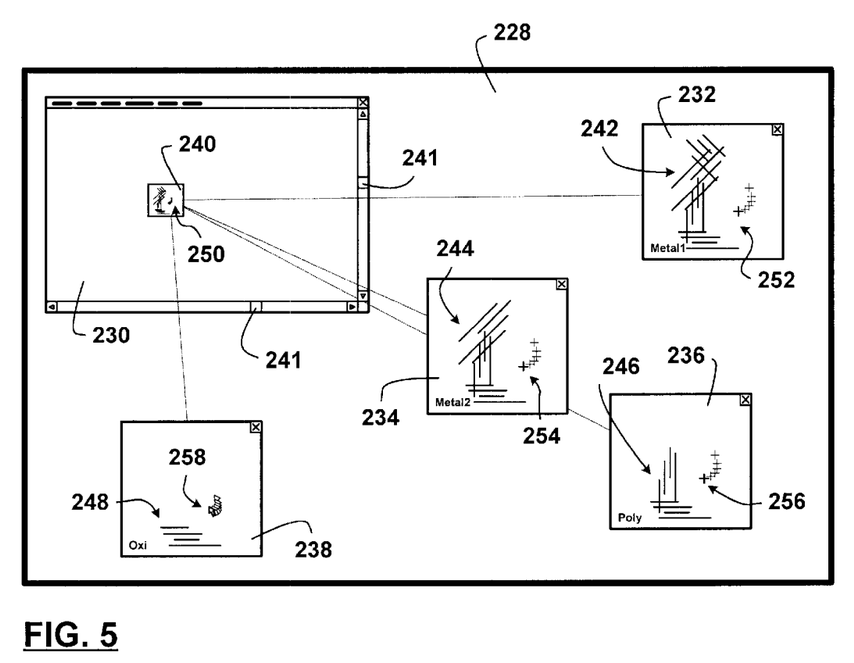
FIG. 5 is a schematic representation of a display area of the man-machine interface showing multiple views and lock-step cursors in accordance with the preferred embodiment of the invention.

FIG. 5 is a schematic diagram showing details of the display area of the man-machine interface shown in FIG. 4. The display area 228 displays a navigation window 230 and mosaic-views 232, 234, 236 and 238, each having a view-boundary. The navigation window 230 provides an overall view of the sample under analysis. The navigation window 230 displays a low magnification digital image of the sample. When the sample under analysis is a single IC die or a substantial portion thereof, the low magnification image displayed in the navigation window 230 is called a die photo. A slice 240 is selected in the navigation window 230 and defines an area-of-interest on the die photo. An exemplary process by which a slice is created will be described bellow with reference to FIGS. 7 and 9.

Mosaic-views 232, 234, 236 and 238 respectively display a portion of an image-mosaic obtained after a particular deconstructive step in the process of deconstructing the IC. The slice 240 defines an area-of-interest displayed in each mosaic-view 232–238. An exemplary process by which mosaic-views are created will be described bellow with reference to FIGS. 8 and 9.

Lock-step cursors 252, 254, 256 and 258 are displayed within each mosaic-view, when appropriate. A corresponding lock-step cursor 250 may also be shown in the navigation window 230. Preferably the lock-step cursors are similar in shape, size and color, except for a master-cursor, shown at 258. The master-cursor 258 indicates a current location of the system pointer 250, controlled by the pointing device 226, when the system pointer is positioned within a mosaic-view. The master-cursor may have the same appearance as the system pointer, or may have a distinctive shape, size and/or color. Lock-step cursors 250, 252, 254, 256 and 258 move in unison under the control of the master-cursor because they share positional coordinates in the sample coordinate space with the master-cursor. The lock-step motion is shown in the diagrams as a trailing effect. An exemplary process by which lock-step motion is achieved is described below with reference to FIG. 10.

In accordance with a preferred embodiment of the invention, mosaic-views 232, 234, 236 and 238 zoom and/or pan in unison, subject to the slice 240 being zoomed or panned. For this purpose the navigation window 230 is shown to have panning sliders.

Figure 6:
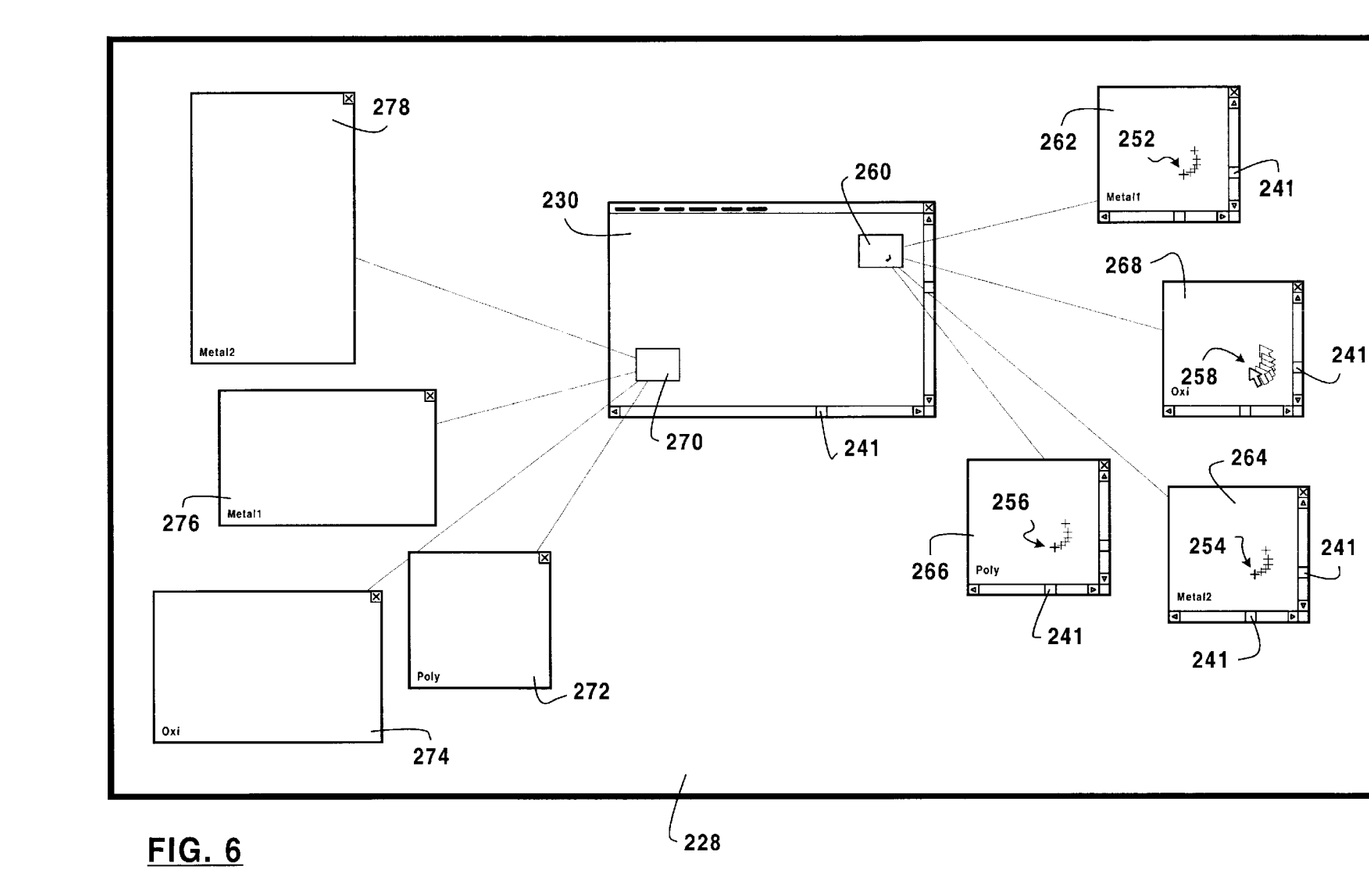
FIG. 6 is another schematic representation of the display area shown in FIG. 5, illustrating multiple views and lock-step cursors in accordance with another embodiment of the invention.

FIG. 6 is another schematic diagram of the display area 228 of the man-machine interface in accordance with another embodiment of the invention. A slice 260 is shown to have associated mosaic-views 262, 264, 266 and 268. In accordance with this embodiment, all mosaic-views zoom or pan as any one of the mosaic-views is zoomed or panned. To accommodate this, each of the mosaic-views 262, 264, 266 and 268 is provided with panning sliders 241.

The navigation window 230 is also shown to have another slice 270 defined. Slice 270 is associated with mosaic-views 272, 274, 276 and 278. In accordance with this embodiment of the invention, mosaic-views 272, 274, 276 and 278 are shown to have dissimilar sizes and each may be resized and zoomed independently.

Figure 7:
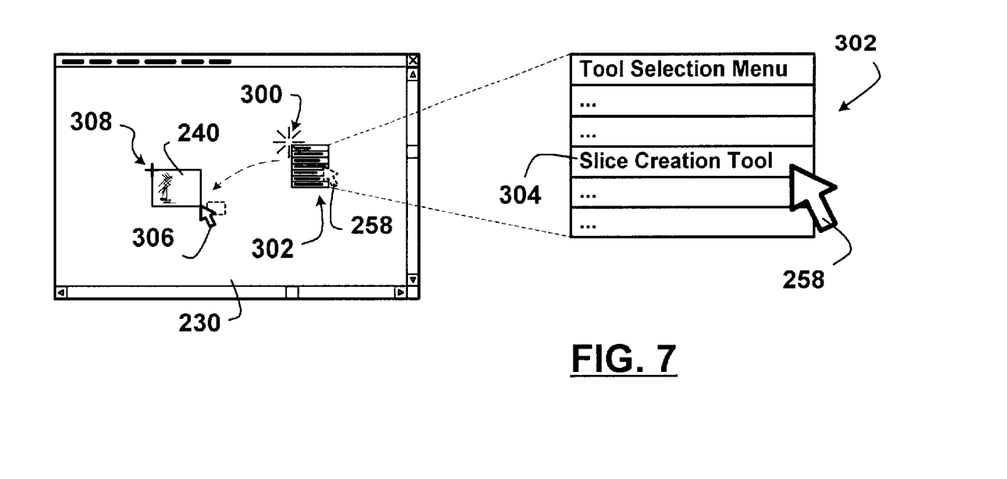
FIG. 7 is a schematic diagram showing the creation of a slice in accordance with a preferred embodiment of the invention.

FIG. 7 is a schematic diagram showing the creation of a slice in accordance with a preferred embodiment of the invention. A slice 240 is created in the navigation window 230 by positioning the system-pointer in the navigation window using the pointing device 226. After the system-pointer is positioned in the navigation window 230 where it is reconfigured and displayed as the master-cursor 258, a trigger event such as a mouse click represented by reference 300 is effected by the engineer analyst 210 (FIG. 4). The trigger event activates a tool selection menu 302. The tool selection menu may be a pop-up menu, for example. A menu item 304 appearing in the tool selection menu 302 permits the engineer analyst 210 to activate a slice creation tool 306. The slice creation tool 306 is used to select an area-of-interest on the die photo by specifying one corner 308 of the area-of-interest by clicking the pointing device and dragging the master-cursor 258 diagonally to create a rectangular slice 240. The tool selection menu may also be implemented as a pull-down menu. The slice creation tool represents one type of slice creator. In accordance with an alternate embodiment of the invention, the slice creation tool can be activated by issuing a slice creation command. In accordance with a further embodiment, slice creation can be activated using a "hot-key". As will be understood by those skilled in the art, other methods of activating slice creation can also be used.

Figure 8:
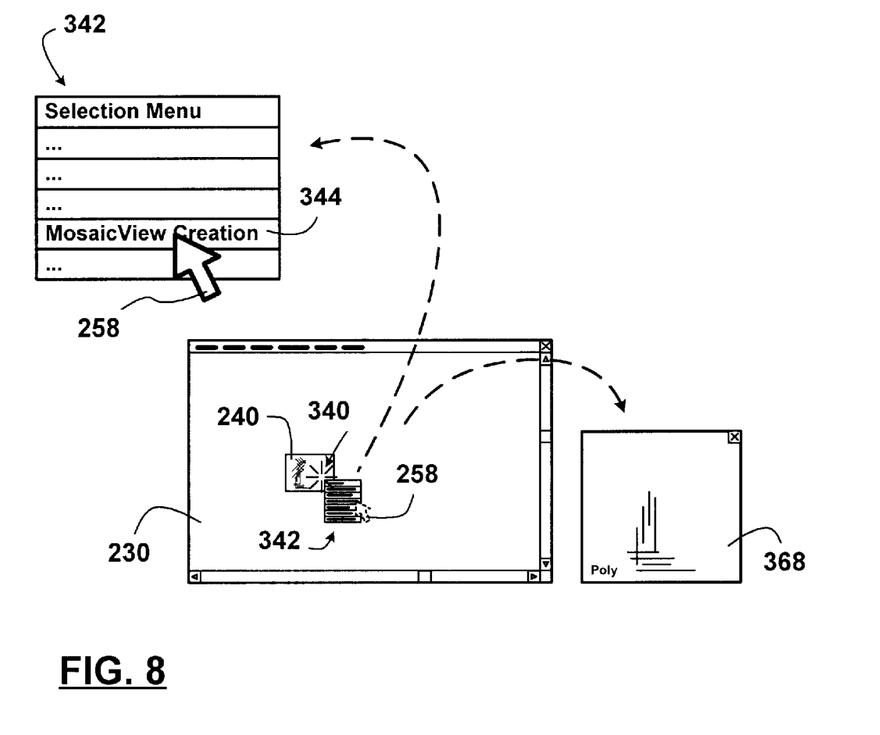
FIG. 8 is a schematic diagram showing the creation of a mosaic-view in accordance with the preferred embodiment of the invention.

FIG. 8 is a schematic diagram showing the creation of a mosaic-view in accordance with an exemplary embodiment of the invention. In accordance with a preferred embodiment of the invention, the slice 240 has an associated mosaic-view creator enabling the creation of mosaic-views.

Figure 9:
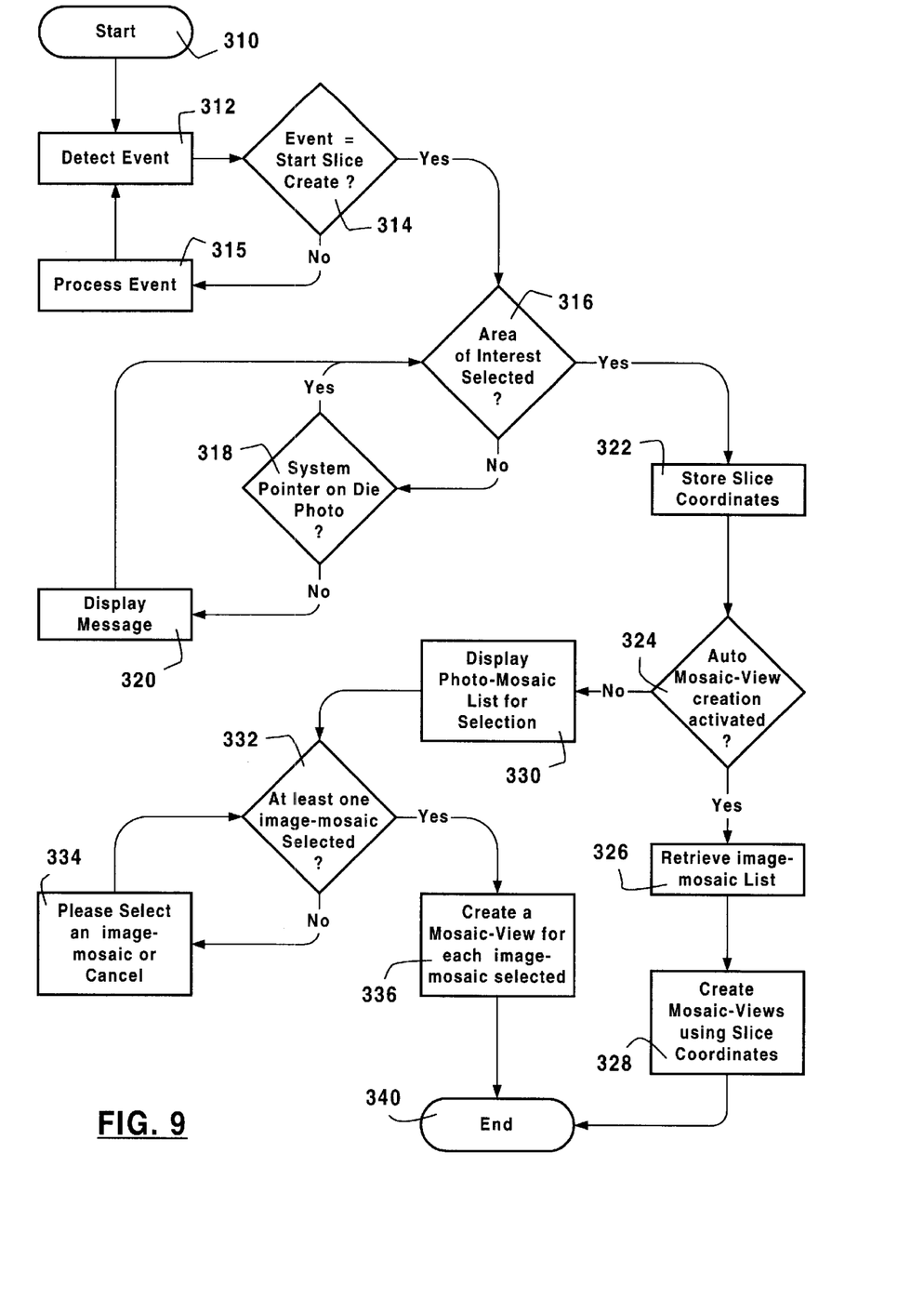
FIG. 9 is a flow diagram showing a process by which a slice is created, an area-of-interest is defined and mosaic-views are created in accordance with the preferred embodiment of the invention.

FIG. 9 is a flow diagram showing a process by which a slice is created in accordance with a preferred embodiment of the invention by selecting an area-of-interest on the die photo and mosaic-views are created for the slice. The slice creation process begins in step 310. In accordance with the preferred embodiment of the invention, the man-machine interface is an event-driven interface that reviews events generated in response to the activities of the engineer analyst 210. As is well understood in the art, interface events may be generated in a plurality of ways, depending on the design of the man-machine interface, as well as the preferences of the engineer analyst 210. For example, as explained above, the creation of a slice may be enabled by the use of a pop-up menu, a pull-down menu, a hot-key or a command mode of operation. Any one or more of these options may be enabled in the man-machine interface in accordance with the invention.

An event is detected in step 312. In step 314, the event is analyzed to determine whether it is a request for slice creation. As noted above, slice creation can be initiated using a menu selection, a command line or a hot-key, for example. If the event is not a slice creation request, the event is processed (step 315) and event monitoring resumes in step 312. If the event is determined in step 314 to be a start slice event, the slice creation process monitors for the return of slice coordinates that define an area-of-interest on the die photo. If coordinates are not returned, for example, within a predetermined time interval (not shown), the position of the system pointer may be tested in step 318 to determine whether the system pointer is on the die photo. If so, the process returns to monitoring for the selection of an area-of-interest. If not, a message may be displayed in step 320 instructing the engineer analyst 210 to select an area-of-interest on the die photo.

When slice coordinates are received, the slice coordinates are stored in memory in step 322 and a slice creation parameter is examined in step 324 to determine whether automatic mosaic-view creation is enabled. Automatic mosaic-view creation is a feature provided in accordance with a preferred embodiment of the invention that automatically creates a mosaic-view for each image-mosaic associated with a slice. Alternatively, the mosaic-views to be displayed for a slice may be selected from a list of all image-mosaics associated with the slice. If the slice creation parameter indicates that automatic mosaic-view creation is enabled (step 324), an image-mosaic list is retrieved in step 326 and one mosaic-view defined by the slice coordinates is created for each image-mosaic, and displayed on the display space 228.

If the slice creation parameter indicates automatic mosaic-view creation is activated (step 324), an image-mosaic list is retrieved in step 326 and one mosaic-view defined by the slice coordinates is created for each image-mosaic, and the mosaic-views are displayed (step 328) on the display space 228 (FIG. 4).

If it is determined (step 324) that automatic mosaic-view creation is not enabled, a list of the image-mosaics associated with the slice is displayed on the display area 228 to permit the engineer analyst 210 to select the image-mosaics for which mosaic-views are to be created (step 330). In step 332, the slice creation process determines whether at least one image-mosaic has been selected from the list displayed in step 330. If not, a message is displayed in step 334 requesting that an image-mosaic be selected or the process canceled (step 334). In step 336, a mosaic-view is created for each image-mosaic selected and the slice creation process ends in step 340.

Figure 10:
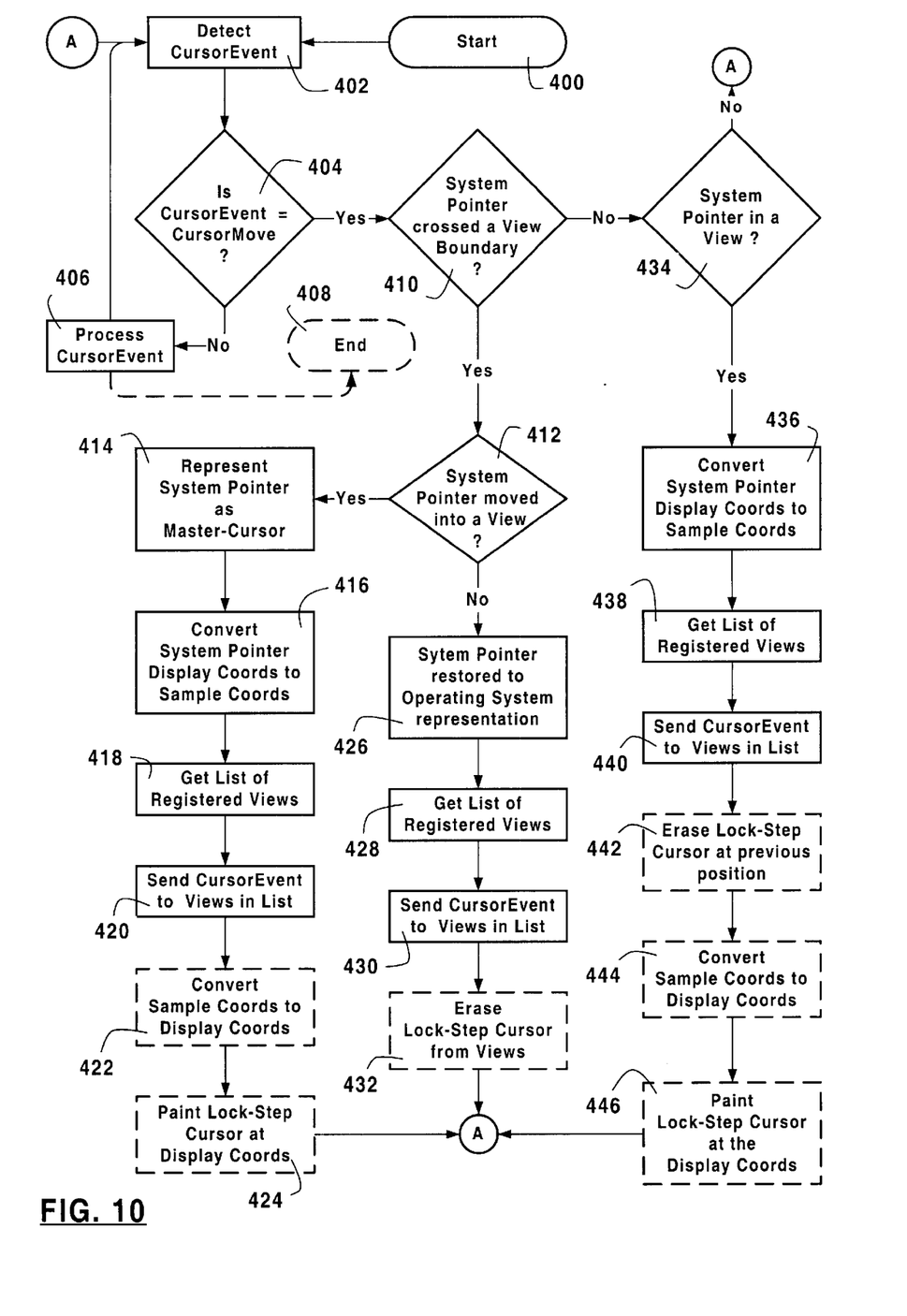
FIG. 10 is a flow diagram showing a process by which lock-step cursor motion is controlled in accordance with a preferred embodiment of the invention.

FIG. 10 is a flow diagram showing a process by which lock-step cursor motion is controlled in accordance with a preferred embodiment of the invention. The process begins in step 400 and is part of a cursor event processing loop in which a cursor event is detected in step 402, the cursor event is analyzed in step 404 to determine whether the cursor event represents a movement of the cursor. If not, the cursor event is processed in step 406. A cursor event such as a "click on the exit button" ends the process in step 408.

If the received cursor event is determined to represent a movement of the cursor in step 404, the process determines in step 410 whether the system pointer has, with respect to the display coordinates, crossed a view-boundary of one of the mosaic-views. If it is determined in step 410 that the system pointer has crossed a view-boundary, the process determines in step 412 whether the system pointer crossed into a view, or left a view. If it is determined that the system pointer crossed into a view in step 412, the system pointer is painted on the display area to represent the master-cursor in step 414. The system pointer's display coordinates are converted to sample coordinates in step 416. A list of all currently registered views is acquired in step 418, and the process iterates through all views in the list sending the cursor event including the sample coordinates of the system master-cursor to each of the views in step 420. The process steps performed by each view when it receives the sample coordinates are shown with dashed borders. Each view converts the sample coordinates of the master-cursor into display coordinates of the view in step 422 and paints a lock-step cursor in the view at the view coordinates (step 424). The process then resumes at step 402.

If it is determined that the system pointer has been moved out of a view in step 412, representation of the system pointer is restored to its operating system representation in step 426. In step 428, the process acquires a list of registered views and iterates through the list to send the cursor event to each of the registered views (step 430). On receiving the cursor event, each view erases the lock-step cursor from the view and the process resumes from step 402.

If it is determined that the cursor event represents a movement of the cursor (step 404) and the system pointer has not crossed a view-boundary (step 410), the process determines whether the system pointer is in a view (step 434). If not, then the process continues from step 402.

If the cursor motion event is received when the system pointer is in a view, the master-cursor's display coordinates are converted into sample coordinates (step 436). A list of registered views is retrieved in step 438, and the cursor event and the master-cursor's new position with respect to the sample coordinate space are sent in an iterative process to each registered view in step 440. Each view erases its lock-step cursor at the position it occupied when the new coordinates were received (step 442), and converts the sample coordinates of the master-cursor into display coordinates of the view in step 444. The view then repaints the lock-step cursor at the new display coordinates, if the display coordinates are within the view.

In an alternate embodiment, lock-step cursor motion is enabled using a global data structure having a scope that extends to all views. The global data structure stores at least the master-cursor's position with respect to the sample coordinate space defined by the physical sample IC under investigation. The man-machine interface processes system pointer events received from the pointing device 226. When each system pointer event is received, typically via a system interrupt, the man-machine interface displays the system pointer at a current position and updates the master-cursor's position. If the system pointer is within the view-boundary of a view, it is painted on the display surface 228 in the shape and configuration of the master-cursor, and the position of the master-cursor in the sample coordinate space is computed and stored in the global data structure. As part of interrupt processing, each one of the other views determine whether the master-cursor's position with respect to the sample coordinate space is displayable within the view-boundary of the view. If so, the view performs a comparison between the sample coordinate space position of the displayed lock-step cursor and the position stored in the global data structure, erasing and repainting the lock-step cursor in the view as required.

If a plurality of workstations, each having a system pointer, are used in extracting design and layout information concurrently from a plurality of image-mosaics representative of a sample IC, master-cursor contention issues may be resolved using selection criteria to determine which system pointer is the master-cursor. The selection criteria may include: limitation to a particular system pointer of a particular workstation; selecting the last system pointer that generated a cursor event; etc.

The embodiments of the invention described above are intended to be exemplary only. The scope of the invention is therefore intended to be limited solely by the scope of the appended claims.

I claim:

1. A man-machine interface for analyzing image-mosaics, the image-mosaics being scaled and aligned to a sample coordinate space, the man-machine interface comprising:
   a) a display area defining a display coordinate space;
   b) a system pointer having a position in the display coordinate space;
   c) a plurality of mosaic-views having respective view-boundaries in the display coordinate space, each mosaic-view displaying at least a portion of one of the image-mosaics, and
   d) a plurality of lock-step cursors sharing positional coordinates with respect to the sample coordinate space;
      whereby the system pointer, upon crossing view-boundary into a-one of the plurality of mosaic-views, is displayed as a master-cursor that controls cursor events and the lock-step cursors are displayed within other mosaic-views at a relative position of the master-cursor with respect to the sample coordinate space, provided that the relative position is within the respective display coordinate space of respective one of the other mosaic-views.

2. A man-machine interface as claimed in claim 1 wherein the image-mosaics are representative of a deconstructed semiconductor integrated circuit (IC) sample.

3. A man-machine interface as claimed in claim 1, wherein each mosaic-view displays a portion of an image-mosaic subject to a magnification factor and performs a translation of lock-step cursor coordinates between the sample coordinate space and the display coordinate space.

4. A man-machine interface as claimed in claim 3, wherein all mosaic-views associated with a slice are subject to the same magnification factor.

5. A man-machine interface as claimed in claim 3, wherein all mosaic-views associated with a slice are subject to the same pan.

6. A man-machine interface as claimed in claim 1 wherein the mosaic-views are created by a slice creation process.

7. A man-machine interface as claimed in claim 6, wherein the slice creation process includes an image-mosaic selector comprising a selection menu.

8. A man-machine interface as claimed in claim 6, wherein the slice creation process includes an image-mosaic selector comprising a hot-key.

9. A man-machine interface as claimed in claim 1, further comprising a navigation window adapted to display a low magnification image of the sample IC die, the navigation window enabling the selection of a slice of the sample IC die, the slice defining an area-of-interest of the respective image-mosaics, each area of interest being optionally displayed in one of the plurality of mosaic-views.

10. A man-machine interface as claimed in claim 9, wherein the navigation window further comprises an associated slice creation tool.

11. A man-machine interface as claimed in claim 10, wherein the slice creation tool is selected from a selection menu.

12. A man-machine interface as claimed in claim 10, wherein the slice creation tool is selected using a hot-key.

13. A man-machine interface as claimed in claim 10, wherein the slice creation tool creates the plurality of mosaic-views subsequent to the creation of the slice.

14. A man-machine interface as claimed in claim 13, wherein each created mosaic-view displays a different image-mosaic upon creation thereof.

15. A man-machine interface as claimed in claim 9, wherein the slice creation tool further comprises an associated mosaic-view creation process.

16. A man-machine interface as claimed in claim 15, wherein the mosaic-view creation process is selected using a selection menu.

17. A man-machine interface as claimed in claim 15, wherein the mosaic-view creation process is selected using a hot-key.

18. A man-machine interface as claimed in claim 1, wherein the system pointer has a first distinctive shape and size.

19. A man-machine interface as claimed in claim 1, wherein the master-cursor has a second distinctive shape and size.

20. A man-machine interface as claimed in claim 1, wherein the lock-step cursor has a third distinctive shape and size.

21. A method of analyzing image-mosaics, the image-mosaics being scaled and aligned to a sample coordinate space, the method comprising steps of:
   a) displaying an area of interest of respective ones of a plurality of the image-mosaics within respective mosaic-views displayed on a display coordinate space of a man-machine interface used to analyze the image-mosaics; and
   b) tracing features of the IC across at least two of the mosaic-views using a master-cursor in one of the mosaic-views and lock-step cursors in others of the mosaic-views, whereby the master-cursor controls cursor events and the lock-step cursors are displayed within the other mosaic-views at a relative position of the master-cursor with respect to the sample coordinate space, provided that the relative position is within the respective display coordinate space of the respective other mosaic-views.

22. The method as claimed in claim 21 further comprising a step of creating the image-mosaics by deconstructing a semiconductor integrated circuit (IC) sample.

23. The method as claimed in claim 21 further comprising a step of defining the area of interest using a slice creation tool to define coordinates on the sample coordinate space.

24. The method as claimed in claim 23 further comprising a step of creating a slice by dragging a system pointer along a diagonal path to define a rectangular area of interest on a low resolution die photo of the IC sample.

25. The method as claimed in claim 24 further comprising a step of selecting the image-mosaics to be displayed in mosaic-views of the area or interest after creating the slice.

26. The method as claimed in clam 25 further comprising a step of selecting the image-mosaics to be displayed in mosaic-views of the area of interest from a list of all image-mosaics associated with the slice.

27. The method as claimed in claim 21 wherein when the master-cursor is removed from the one of the mosaics, the master-cursor becomes a system pointer on the display surface of the man-machine interface, and the lock-step cursors are erased from each of the other mosaic-views.

28. Apparatus for analyzing image-mosaics, the image-mosaics being scaled and aligned to a sample coordinate space, the apparatus comprising:
   a) a workstation having a display area that defines a display coordinate space;
   b) a pointing device that controls a system pointer that may be moved within the display coordinate space;
   c) a memory for storing a plurality of mosaic-views having respective view-boundaries when displayed in the display coordinate space, each mosaic-view displaying at least a portion of one of the image-mosaics, and
   d) means for displaying a lock-step cursor within each of the mosaic-views, the lock-step cursors sharing positional coordinates with respect to the sample coordinate space;
   whereby the system pointer, upon being moved across a view-boundary into one of the plurality of mosaic-views by manipulation of the pointing device, is displayed as a master-cursor that controls cursor events and the lock-step cursors are displayed within other mosaic-views at a relative position of the master-cursor with respect to the sample coordinate space, provided that the relative position is within the respective display coordinate space of respective one of the other mosaic-views.

29. Apparatus as claimed in claim 28 wherein the display area comprises one of a Cathode Ray Tube (CRT), a Liquid Crystal Display (LCD), and an image projected by an image projector.

30. Apparatus as claimed in claim 28 wherein the pointing device comprises a mouse.

31. Apparatus as claimed in claim 28 wherein the means for displaying the lock-step cursors is event driven.

32. Apparatus as claimed in claim 31 wherein on detecting a cursor event indicating cursor movement, the means for displaying converts coordinates of the system pointer in the display coordinate space to coordinates in the sample coordinate space and performs an iterative process to send the coordinates in the sample coordinate space to each of the other mosaic-views, if the coordinates of the system pointer in the display coordinate space are within a one of the mosaic-views.

33. Apparatus as claimed in claim 28 wherein the image-mosaics are representative of a deconstructed semiconductor integrated circuit (IC) sample.

* * * * *